United States Patent
Zhu

(10) Patent No.: US 10,253,435 B2
(45) Date of Patent: Apr. 9, 2019

(54) CARBON-CONTAINING FIBER BLENDS INCLUDING ARAMID AND MODACRYLIC FIBER

(71) Applicant: E I DU PONT DE NEMOURS AND COMPANY, Wilmington, DE (US)

(72) Inventor: Reiyao Zhu, Moseley, VA (US)

(73) Assignee: E I DU PONT DE NEMOURS AND COMPANY, Wilmington, DE (US)

( * ) Notice: Subject to any disclaimer, the term of this patent is extended or adjusted under 35 U.S.C. 154(b) by 7 days.

(21) Appl. No.: 15/669,058

(22) Filed: Aug. 4, 2017

(65) Prior Publication Data

US 2018/0057965 A1 Mar. 1, 2018

Related U.S. Application Data

(60) Provisional application No. 62/382,554, filed on Sep. 1, 2016.

(51) Int. Cl.
| | |
|---|---|
| D01F 8/10 | (2006.01) |
| A41D 13/008 | (2006.01) |
| A41D 31/00 | (2019.01) |
| C08L 33/20 | (2006.01) |
| D02G 3/44 | (2006.01) |
| D03D 1/00 | (2006.01) |
| D03D 15/12 | (2006.01) |
| D01F 1/09 | (2006.01) |
| D01F 6/60 | (2006.01) |

(52) U.S. Cl.
CPC ............. *D01F 8/10* (2013.01); *A41D 13/008* (2013.01); *A41D 31/0022* (2013.01); *A41D 31/0066* (2013.01); *C08L 33/20* (2013.01); *D01F 1/09* (2013.01); *D01F 6/605* (2013.01); *D02G 3/443* (2013.01); *D03D 1/0035* (2013.01); *D03D 15/12* (2013.01); *C08L 2203/12* (2013.01); *C08L 2205/025* (2013.01); *C08L 2205/03* (2013.01); *D10B 2331/021* (2013.01); *D10B 2501/04* (2013.01)

(58) Field of Classification Search
CPC ........ D01F 8/10; C08L 33/20; C08L 2203/12; C08L 2205/03; C08L 2205/025; A41D 13/008; A41D 31/0022
USPC ........................................................ 524/514
See application file for complete search history.

(56) References Cited

U.S. PATENT DOCUMENTS

| | | |
|---|---|---|
| 3,094,511 A | 6/1963 | Hill, Jr. et al. |
| 3,193,602 A | 7/1965 | Leonard et al. |
| 3,354,127 A | 11/1967 | Hill, Jr. et al. |
| 3,673,143 A | 6/1972 | Bair et al. |
| 3,748,302 A | 7/1973 | Jones |
| 3,803,453 A | 4/1974 | Hull |
| 3,819,587 A | 6/1974 | Kwoleck |
| 3,869,429 A | 3/1975 | Blades |
| 4,172,938 A | 10/1979 | Mera et al. |
| 4,612,150 A | 9/1986 | De Howitt |
| 4,668,234 A | 5/1987 | Vance et al. |
| 4,755,335 A | 7/1988 | Ghorashi |
| 4,883,496 A | 11/1989 | Ghorashi |
| 5,096,459 A | 3/1992 | Ghorashi |
| 5,208,105 A | 5/1993 | Ichibori et al. |
| 5,506,042 A | 4/1996 | Ichibori et al. |
| 7,065,950 B2 | 6/2006 | Zhu et al. |
| 7,348,059 B2 | 3/2008 | Zhu et al. |
| 2010/0299816 A1* | 12/2010 | Zhu ...................... D02G 3/047 2/458 |

FOREIGN PATENT DOCUMENTS

| | | |
|---|---|---|
| CN | 103352284 | 10/2013 |
| EP | 1725705 A1 | 11/2006 |
| JP | 2015094043 A | 5/2015 |
| KR | 101447517 B1 | 10/2014 |
| WO | 0077283 A2 | 12/2000 |
| WO | 2005090661 A1 | 9/2005 |

OTHER PUBLICATIONS

PCT International Search Report, dated Nov. 16, 2017, for International Application No. PCT/US2017/046567, filed Aug. 11, 2017, ISA/European Patent Office; Jo Verschuren Authorized Officer.
Black et al., Section titled "Fiber-Forming Aromatic Polyamides", Man-Made Fibers—Science and Technology, vol. 2, p. 298-299, Interscience Publishers, 1968.

* cited by examiner

*Primary Examiner* — Hui H Chin

(57) ABSTRACT

An intimate blend of staple fibers, and a yarn, fabric, and article of clothing providing surprising arc performance; the intimate blend comprises 15 to 70 weight percent modacrylic fiber, 5 to 27 weight percent para-aramid fiber; and 3 to 80 weight percent meta-aramid fiber, wherein 25 to 100 parts of the meta-aramid fiber contains 0.5 to 20 weight percent discrete homogeneously dispersed carbon particles and 0 to 75 parts of the meta-aramid fiber free of discrete carbon particles, the intimate blend having a total content of 0.1 to 3 weight percent discrete carbon particles.

10 Claims, 1 Drawing Sheet

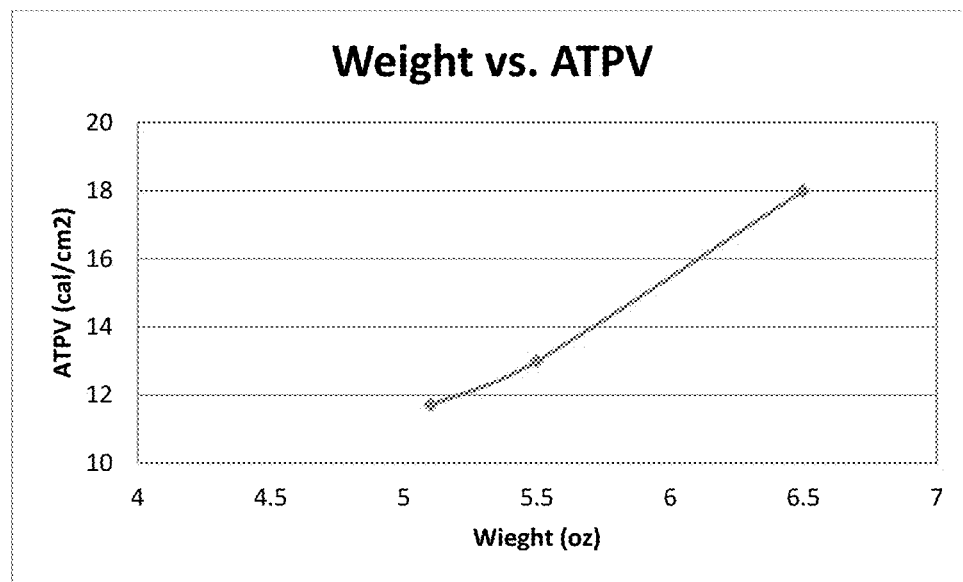

CARBON-CONTAINING FIBER BLENDS INCLUDING ARAMID AND MODACRYLIC FIBER

BACKGROUND OF THE INVENTION

Field of the Invention

This invention relates to fiber blends of modacrylic, meta-aramid, and para-aramid fibers, and yarns, fabrics, and articles made from such blends that provide protection to workers from electrical arcs.

Description of Related Art

Industrial workers and others that can be exposed to electrical arcs and the like need protective clothing and articles made from thermally resistant fabrics.

Any increase in the effectiveness of these protective articles, or any increase in the comfort of these articles while maintaining protection performance, is welcomed.

Carbon particles have been used as a spun-in pigment in the coloration of fibers, the black color of carbon being effective in generating dark shades.

U.S. Pat. Nos. 7,065,950 and 7,348,059 to Zhu et al. disclose a yarn, fabric, and garment for use in arc and flame protection that contains modacrylic, para-aramid, and meta-aramid fibers. While these fiber blends have been found to be very useful in arc protection, any improvement in arc protection is welcomed as it can potentially save lives.

BRIEF SUMMARY OF THE INVENTION

This invention relates to an intimate blend of staple fibers, comprising 15 to 70 weight percent modacrylic fiber, 5 to 27 weight percent para-aramid fiber, and 3 to 80 weight percent meta-aramid fiber; wherein 25 to 100 parts of the meta-aramid fiber present in the blend contains 0.5 to 20 weight percent discrete carbon particles based on the amount of carbon particles in an individual fiber, the carbon particles being homogeneously dispersed in that fiber; and 0 to 75 parts of the meta-aramid fiber present in the blend are free of discrete carbon particles, the intimate blend having a total content of 0.1 to 3 weight percent discrete carbon particles.

In some embodiments, this invention relates to an intimate blend of staple fibers of claim 1, comprising 40 to 70 weight percent modacrylic fiber, 5 to 20 weight percent para-aramid fiber, and 10 to 40 weight percent meta-aramid fiber; wherein 25 to 100 parts of the meta-aramid fiber present in the blend contains 0.5 to 20 weight percent discrete carbon particles based on the amount of carbon particles in an individual fiber, the carbon particles being homogeneously dispersed in that fiber; and 0 to 75 parts of the meta-aramid fiber present in the blend are free of discrete carbon particles; the intimate blend having a total content of 0.1 to 3 weight percent discrete carbon particles.

This invention further relates to yarns, fabrics, and articles of thermal protective clothing, such as garments, which comprise these intimate blends.

BRIEF DESCRIPTION OF THE DRAWINGS

FIG. 1 shows the relationship between the arc performance and the basis weight of a fabric made from the claimed intimate blend of staple fibers.

DETAILED DESCRIPTION OF THE INVENTION

This invention relates to an intimate blend of staple fibers, comprising modacrylic fiber, para-aramid fiber, and meta-aramid fiber; wherein 25 to 100 parts of the meta-aramid fiber contain homogeneously dispersed discrete carbon particles and 0 to 75 parts of the meta-aramid fiber are free of discrete carbon particles; the intimate blend having a total content of 0.1 to 3 weight percent discrete carbon particles.

This intimate blend of fibers, and yarns, fabrics, and articles of clothing, such as garments, which comprise these intimate blends, are useful in providing arc protection for workers and other personnel. An arc flash is an explosive release of energy caused by an electrical arc. Electrical arcs typically involve thousands of volts and thousands of amperes of electrical current, exposing the garment to intense incident heat and radiant energy. To offer protection to a wearer, an article of protective apparel must resist the transfer of this incident energy through to the wearer. It has been believed that this occurs best when the article of protective apparel absorbs a portion of the incident energy while resisting what is called "break-open". During "break-open", a hole forms in the article. Therefore, protective articles or garments for arc protection have been designed to avoid or minimize break-open of any of the fabric layers in the garment.

It has been found that the arc performance of fabrics and garments can be increased on the order of almost two times by the addition of a small amount of discrete carbon particles in the polymer of fire-resistant and thermally stable fiber. As used herein fire-resistant means the polymer has a limiting oxygen index greater than 21 and preferably greater than 25; and the term "thermally stable" means the polymer or fiber retains at least 90 percent of its weight when heated to 425 degrees Celsius at a rate of 10 degrees per minute. Specifically, on an intimate fiber blend basis, such dramatic improvement can be found when the total amount of discrete carbon particles in the blend of fibers is 0.1 to 3 weight percent, based on the total amount of fibers in the blend. In some preferred embodiments, the total amount of discrete carbon particles in the blend of fibers is 0.5 to 3 weight percent, based on the total amount of fibers in the blend.

On a fabric weight basis, a dramatic improvement has been found when the total amount of discrete carbon particles in the fabric is 0.1 to 3 weight percent, based on the total amount of fiber in the fabric. The presence of these carbon particles can have a significant effect on the fabric arc performance, as measured by ATPV, even at very low loadings. The best performance is found for carbon particles amounts of greater than about 0.5 weight percent in the fabric, with a preferred performance of 12 cal/cm$^2$ or greater occurring for fabrics having about 0.75 weight percent carbon particles or greater, with an especially desired range being 0.75 to 2 weight percent carbon particles in the fabric.

For purposes herein, the term "fiber" is defined as a relatively flexible, macroscopically homogeneous body having a high ratio of length to the width of the cross-sectional area perpendicular to that length. The fiber cross section can be any shape depending on the polymer and it's processing, but is typically round or bean-shaped. Also, such fibers preferably have a generally solid cross section for adequate strength in textile uses; that is, the fibers preferably are not appreciably voided or do not have a large quantity of objectionable voids.

As used herein, the term "staple fibers" refers to fibers that are cut to a desired length or are stretch broken, or fibers that are made having a low ratio of length to the width of the cross-sectional area perpendicular to that length, when compared with continuous filaments. Man-made staple fibers are cut or made to a length suitable for processing on, for example, cotton, woolen, or worsted yarn spinning equipment. The staple fibers can have (a) substantially uniform length, (b) variable or random length, or (c) subsets of the staple fibers have substantially uniform length and the staple fibers in the other subsets have different lengths, with the staple fibers in the subsets mixed together forming a substantially uniform distribution.

In some embodiments, suitable staple fibers have a cut length of from 1 to 30 centimeters (0.39 to 12 inches). In some embodiments, suitable staple fibers have a length of 2.5 to 20 cm (1 to 8 in). In some preferred embodiments the staple fibers made by short staple processes have a cut length of 6 cm (2.4 in) or less. In some preferred embodiments the staple fibers made by short staple processes have a staple fiber length of 1.9 to 5.7 cm (0.75 to 2.25 in) with the fiber lengths of 3.8 to 5.1 cm (1.5 to 2.0 in) being especially preferred. For long staple, worsted, or woolen system spinning, fibers having a length of up to 16.5 cm (6.5 in) are preferred.

The staple fibers can be made by any process. For example, the staple fibers can be cut from continuous straight fibers using a rotary cutter or a guillotine cutter resulting in straight (i.e., non-crimped) staple fiber, or additionally cut from crimped continuous fibers having a saw tooth shaped crimp along the length of the staple fiber, with a crimp (or repeating bend) frequency of preferably no more than 8 crimps per centimeter. Preferably the staple fibers have crimp.

The staple fibers can also be formed by stretch breaking continuous fibers resulting in staple fibers with deformed sections that act as crimps. Stretch broken staple fibers can be made by breaking a tow or a bundle of continuous filaments during a stretch break operation having one or more break zones that are a prescribed distance creating a random variable mass of fibers having an average cut length controlled by break zone adjustment.

Spun staple yarn can be made from staple fibers using traditional long and short staple ring spinning processes that are well known in the art. However, this is not intended to be limiting to ring spinning because the yarns may also be spun using air jet spinning, open end spinning, and many other types of spinning that converts staple fiber into useable yarns. Spun staple yarns can also be made directly by stretch breaking using stretch-broken tow-to-top staple processes. The staple fibers in the yarns formed by traditional stretch break processes typically have length of up to 18 cm (7 in) long; however, spun staple yarns made by stretch breaking can also have staple fibers having maximum lengths of up to around 50 cm (20 in.) through processes as described for example in PCT Patent Application No. WO 0077283. Stretch broken staple fibers normally do not require crimp because the stretch-breaking process imparts a degree of crimp into the fiber.

By "fiber blend" it is meant the combination of two or more staple fiber types in any manner. Preferably the staple fiber blend is an "intimate blend", meaning the various staple fibers in the blend form a relatively uniform mixture of the fibers. In some embodiments the staple fiber types are blended prior to or while a staple fiber yarn is being spun so that the various staple fibers are distributed homogeneously in the staple yarn bundle. In some embodiments the intimate blend consists essentially of modacrylic staple fiber, meta-aramid staple fiber, and para-aramid staple fiber. In some embodiments the intimate blend consists essentially of modacrylic staple fiber, meta-aramid staple fiber, para-aramid staple fiber, and a very small amount of an antistat fiber. In some preferred embodiments the intimate blend consists solely of modacrylic staple fiber, meta-aramid staple fiber, para-aramid staple fiber, and antistat fiber.

The intimate blend of staple fibers preferably has a lightness coordinate or "L*" value of 40 or greater on the 1976 CIELAB color scale. Some embodiments also have a spectral reflectance of 20% or greater over the wavelengths of visible light (380 to 780 nm). The color of fabrics can be measured using a spectrophotometer, also called a colorimeter, which provides three scale values "L*", "a*", and "b*" representing various characteristics of the color of the item measured, and the spectral reflectance. On the color scale, lower "L*" values generally indicate a darker color, with the color white having a value of about or near 100 and black having a color of about or near 0. In its natural state and before any coloration, poly(meta-phenylene isophthalamide) fiber has a slightly off-white color that when measured using a colorimeter has a "L*" value of about 80 or higher. Poly(meta-phenylene isophthalamide) fiber further comprising 0.5 to 20 weight percent discrete carbon particles has a black color that when measured using a colorimeter has a "L*" value that ranges about 20 or less.

In one embodiment the intimate blend of staple fibers comprises 15 to 70 weight percent modacrylic fiber, 5 to 27 weight percent para-aramid fiber, and 3 to 80 weight percent meta-aramid fiber; wherein 25 to 100 parts of the meta-aramid fiber present in the blend contains 0.5 to 20 weight percent discrete carbon particles based on the amount of carbon particles in an individual meta-aramid fiber, the carbon particles being homogeneously dispersed in that fiber; and 0 to 75 parts of the meta-aramid fiber present in the blend being free of discrete carbon particles; the intimate blend having a total content of 0.1 to 3 weight percent discrete carbon particles.

In some embodiments, this intimate blend of staple fibers comprises 40 to 70 weight percent modacrylic fiber, 5 to 20 weight percent para-aramid fiber, and 10 to 40 weight percent meta-aramid fiber; wherein 25 to 100 parts of the meta-aramid fiber present in the blend contains 0.5 to 20 weight percent discrete carbon particles based on the amount of carbon particles in an individual fiber, the carbon particles being homogeneously dispersed in that fiber; and 0 to 75 parts of the meta-aramid fiber present in the blend are free of discrete carbon particles; the intimate blend having a total content of 0.1 to 3 weight percent discrete carbon particles.

In some embodiments, 25 to 100 parts of the meta-aramid fiber present in the blend contains 2 to 5 weight percent discrete carbon particles based on the amount of carbon particles in an individual fiber and 0 to 75 parts of the meta-aramid fiber present in the blend are free of discrete carbon particles.

The phrase "homogeneously dispersed in that fiber" means that the carbon particles can be found in the fibers uniformly distributed in both the axial and radial directions in the fiber. It is believed that one way of achieving this uniform distribution is by spinning, either by wet or dry spinning, a polymer solution containing the carbon particles.

It has been found that for the desired arc performance or Arc Thermal Performance Value (ATPV), the carbon-particle-containing aramid fiber comprises 0.5 to 20 weight percent discrete carbon particles, based on the amount of carbon particles in an individual fiber. In some embodiments, the carbon-particle-containing aramid fiber comprises 0.5 to 10 weight percent discrete carbon particles, based on the amount of carbon particles in an individual fiber; in some embodiments the carbon-particle-containing aramid fiber comprises 0.5 to 6 weight percent discrete carbon particles, based on the amount of carbon particles in an individual fiber. In some other embodiments, it is desirable to have 5 to 10 weight percent discrete carbon particles in the carbon-particle-containing aramid fiber, based on the amount of carbon particles in an individual fiber. In one preferred embodiment the carbon-particle-containing aramid fiber comprises 0.5 to 3.0 weight percent discrete carbon particles.

As present in the fiber, the carbon particles have an average particle size of 10 micrometers or less, preferably averaging 0.1 to 5 micrometers; in some embodiments an average particle size of 0.5 to 3 micrometers is preferred. In some embodiments an average particle size of 0.1 to 2 micrometers is desirable; and in some embodiments an average particle size of 0.5 to 1.5 micrometers is preferred. Carbon particles include such things as carbon black produced by the incomplete combustion of heavy petroleum products and vegetable oils. Carbon black is a form of paracrystalline carbon that has a higher surface-area-to-volume ratio than soot but lower than that of activated carbon. They are typically incorporated into the fibers by adding the carbon particles to the spin dope prior to the formation of the fibers via spinning.

Essentially any commercially available carbon-black can be used to supply the discrete carbon particles to the aramid polymer composition. They are typically incorporated into the fibers by adding the carbon particles to the spin dope prior to the formation of the fibers via spinning. In one preferred practice, a separate stable dispersion of the carbon-black in a polymer solution, preferably an aramid polymer solution, is first made, and then the dispersion is milled to achieve a uniform particle distribution. This dispersion is then preferably injected into the aramid polymer solution prior to spinning.

The intimate fiber blend comprises fibers made from modacrylic polymer. By modacrylic polymer it is meant preferably the polymer is a copolymer comprising 30 to 70 weight percent of acrylonitrile and 70 to 30 weight percent of a halogen-containing vinyl monomer. The halogen-containing vinyl monomer is at least one monomer selected, for example, from vinyl chloride, vinylidene chloride, vinyl bromide, vinylidene bromide, etc.

In some embodiments the modacrylic copolymers are those of acrylonitrile combined with vinylidene chloride. In some embodiments, the modacrylic copolymer has in addition antimony oxide or antimony oxides. In some preferred embodiments the modacrylic copolymer has either less than 1.5 weight percent antimony oxide or antimony oxides, or the copolymer is totally free of antimony. Very low antimony content polymer and antimony-free polymer can be made by restricting the amount of, or eliminating entirely, any antimony compounds added to the copolymer during manufacture. Representative processes for modacrylic polymers, including those that can be modified in this manner are disclosed in U.S. Pat. No. 3,193,602 having 2 weight percent antimony trioxide; U.S. Pat. No. 3,748,302 made with various antimony oxides that are present in an amount of at least 2 weight percent and preferably not greater than 8 weight percent; and U.S. Pat. Nos. 5,208,105 & 5,506,042 having 8 to 40 weight percent of an antimony compound.

In some embodiments, within the modacrylic polymer has an LOI of at least 26. In one preferred embodiment the modacrylic polymer has a LOI of at least 26 while also being antimony-free. In some embodiments the modacrylic fiber is free of discrete carbon particles, meaning that the fiber does not contain carbon particles as defined herein.

The intimate fiber blend further comprises aramid fibers; preferably fibers made from an aramid polymer having a Limiting Oxygen Index (LOI) above the concentration of oxygen in air (that is, greater than 21 and preferably greater than 25). This means the fiber or a fabric made solely from that fiber will not support flame and is considered fire-resistant. The aramid fiber also retains at least 90 percent of its weight when heated to 425 degrees Celsius at a rate of 10 degrees per minute, meaning that this fiber has high thermal stability.

The intimate fiber blend preferably includes those made from para-aramid (para-aramid) polymers and meta-aramid (meta-aramid) polymers. As used herein, "aramid" is meant a polyamide wherein at least 85% of the amide (—CONH—) linkages are attached directly to two aromatic rings. Additives can be used with the aramid and, in fact, it has been found that up to as much as 10 percent, by weight, of other polymeric material can be blended with the aramid or that copolymers can be used having as much as 10 percent of other diamine substituted for the diamine of the aramid or as much as 10 percent of other diacid chloride substituted for the diacid chloride of the aramid. Suitable aramid fibers are described in Man-Made Fibers—Science and Technology, Volume 2, Section titled Fiber-Forming Aromatic Polyamides, page 297, W. Black et al., Interscience Publishers, 1968. Aramid fibers are, also, disclosed in U.S. Pat. Nos. 4,172,938; 3,869,429; 3,819,587; 3,673,143; 3,354,127; and 3,094,511.

Para-aramid polymers are those aramids where the amide linkages are in the para-position relative to each other. Preferably the para-aramid polymer has an LOI typically at least about 25. One preferred para-aramid is poly(paraphenylene terephthalamide).

Meta-aramid polymers are those aramids where the amide linkages are in the meta-position relative to each other. Preferably the meta-aramid polymer has an LOI typically at least about 25. One preferred meta-aramid is poly(metaphenylene isophthalamide).

In some embodiments, the meta-aramid fiber has a minimum degree of crystallinity of at least 20% and more preferably at least 25%. For purposes of illustration, due to ease of formation of the final fiber, a practical upper limit of crystallinity is about 50% (although higher percentages are considered suitable). Generally, the crystallinity will be in a range from 25 to 40%. The degree of crystallinity of a meta-aramid fiber can be determined by one of two methods. The first method is employed with a non-voided fiber while the second is employed on a fiber that is not totally free of voids. The percent crystallinity of meta-aramids in the first method is determined by first generating a linear calibration curve for crystallinity using good, essentially non-voided samples. For such non-voided samples, the specific volume (1/density) can be directly related to crystallinity using a two-phase model. The density of the sample is measured in a density gradient column. A meta-aramid film, determined to be non-crystalline by x-ray scattering methods, was measured and found to have an average density of 1.3356 g/cm3. The density of a completely crystalline meta-aramid sample was then determined from the dimensions of the x-ray unit cell to be 1.4699 g/cm3. Once these 0% and 100% crystallinity end points are established, the crystallinity of any non-voided experimental sample for which the density is known can be determined from this linear relationship:

$$\text{Crystallinity} = \frac{(1/\text{non-crystalline density}) - (1/\text{experimental density})}{(1/\text{non-crystalline density}) - (1/\text{fully-crystalline density})}$$

Since many fiber samples are not totally free of voids, Raman spectroscopy is the preferred method to determine crystallinity. Since the Raman measurement is not sensitive to void content, the relative intensity of the carbonyl stretch at $1650^{-1}$ cm can be used to determine the crystallinity of a meta-aramid in any form, whether voided or not. To accomplish this, a linear relationship between crystallinity and the intensity of the carbonyl stretch at 1650 cm$^{-1}$, normalized to the intensity of the ring stretching mode at 1002 cm$^{-1}$, was developed using minimally voided samples whose crystallinity was previously determined and known from density measurements as described above. The following empirical relationship, which is dependent on the density calibration curve, was developed for percent crystallinity using a Nicolet Model 910 FT-Raman Spectrometer:

$$\% \text{ Crystallinity} = \frac{100.0 \times (I(1650 \text{ cm}^{-1}) - 0.2601)}{0.1247}$$

where I(1650 cm$^{-1}$) is the Raman intensity of the meta-aramid sample at that point. Using this intensity, the percent crystallinity of the experiment sample is calculated from the equation.

Meta-aramid fibers, when spun from solution, quenched, and dried using temperatures below the glass transition temperature, without additional heat or chemical treatment, develop only minor levels of crystallinity. Such fibers have a percent crystallinity of less than 15 percent when the crystallinity of the fiber is measured using Raman scattering techniques. These fibers with a low degree of crystallinity are considered amorphous meta-aramid fibers that can be crystallized through the use of heat or chemical means. The level of crystallinity can be increased by heat treatment at or above the glass transition temperature of the polymer. Such heat is typically applied by contacting the fiber with heated rolls under tension for a time sufficient to impart the desired amount of crystallinity to the fiber.

The level of crystallinity of m-aramid fibers can also be increased by a chemical treatment, and in some embodiments this includes methods that color, dye, or mock dye the fibers prior to being incorporated into a fabric. Some methods are disclosed in, for example, U.S. Pat. Nos. 4,668,234; 4,755,335; 4,883,496; and 5,096,459. A dye assist agent, also known as a dye carrier may be used to help increase dye pick up of the aramid fibers. Useful dye carriers include aryl ether, benzyl alcohol, or acetophenone.

In the intimate fiber blend, 25 to 100 parts of the meta-aramid fiber present in the blend contains 0.5 to 20 weight percent discrete carbon particles based on the amount of carbon particles in an individual fiber. The carbon particles are homogeneously dispersed in the fiber. Further, 0 to 75 parts of the meta-aramid fiber present in the blend are free of discrete carbon particles. The amount of carbon-particle-containing fiber is such that the intimate blend has a total content of 0.1 to 3 weight percent discrete carbon particles, based on the amount of carbon particles in the meta-aramid fiber and the total amount of staple fibers in the intimate blend.

In some embodiments, if desired, the intimate blend of staple fibers can further comprise a very minor amount (1-3% by weight of the yarn) of an antistat fiber. One suitable antistat fiber is melt-spun thermoplastic antistatic fibers such as those described in U.S. Pat. No. 4,612,150 to De Howitt and/or U.S. Pat. No. 3,803,453 to Hull. These fibers, while they contain carbon black, have a negligible impact on arc performance, since the fiber polymer does not have the combination of being flame resistant and thermally stable; that is, it does not have in combination a LOI of greater than 21, preferably greater than 25, and does not retain at least 90 percent of its weight when heated to 425 degrees Celsius at a rate of 10 degrees per minute. In fact, such thermoplastic antistat fibers lose in excess of 35 weight percent when heated to 425 degrees Celsius at a rate of 10 degrees per minute. For the purposes herein, and to avoid any confusion, the total content in the weight percent of discrete carbon particles is based on the total weight of the fiber blend, excluding any minor amount of antistat fibers.

The intimate blend of staple fibers can be made by cutter blending strands or tows of different fibers or by blending different bales of fibers and other means know in the art of forming an intimate blend. For example, the two or more slivers of different staple fiber types can be blended prior to or while a staple fiber yarn is being spun so that the various staple fibers are distributed homogeneously as an intimate blend in the staple yarn bundle By "yarn" is meant an assemblage of fibers spun or twisted together to form a continuous strand. As used herein, a yarn generally refers to what is known in the art as a singles yarn, which is the simplest strand of textile material suitable for such operations as weaving and knitting; or a ply yarn or plied yarn. A spun staple yarn can be formed from staple fibers with more or less twist. When twist is present in a singles yarn, it is all in the same direction. As used herein the phrases "ply yarn" and "plied yarn" can be used interchangeably and refer to two or more yarns, i.e. singles yarns, twisted or plied together.

Fabrics can be made from the spun staple yarns comprising the intimate blends of staple fibers as described herein and can include, but is not limited to, woven or knitted fabrics. General fabric designs and constructions are well known to those skilled in the art. By "woven" fabric is meant a fabric usually formed on a loom by interlacing warp or lengthwise yarns and filling or crosswise yarns with each other to generate any fabric weave, such as plain weave, crowfoot weave, basket weave, satin weave, twill weave, and the like. Plain and twill weaves are believed to be the most common weaves used in the trade and are preferred in many embodiments.

By "knitted" fabric is meant a fabric usually formed by interlooping yarn loops by the use of needles. In many instances, to make a knitted fabric spun staple yarn is fed to a knitting machine which converts the yarn to fabric. If desired, multiple ends or yarns can be supplied to the knitting machine either plied of unplied; that is, a bundle of yarns or a bundle of plied yarns can be co-fed to the knitting machine and knitted into a fabric, or directly into an article of apparel such as a glove, using conventional techniques. The tightness of the knit can be adjusted to meet any specific need. A very effective combination of properties for protective apparel has been found in for example, single jersey knit and terry knit patterns.

In some particularly useful embodiments, the spun staple yarns comprising the intimate blends of staple fibers can be used to make arc-resistant and flame-resistant garments. In some embodiments the garments can have essentially one layer of the protective fabric made from the spun staple yarn. Garments of this type include jumpsuits, coveralls, pants, shirts, gloves, sleeves and the like that can be worn in situations such as chemical processing industries or industrial or electrical utilities where an extreme thermal event might occur. In one preferred embodiment, the garment is made from the fabric comprising the yarns of the intimate blends of staple fibers described herein. Alternatively, the article of clothing could utilize a sewing threat comprising the intimate blend of staple fibers described herein.

Protective articles or garments of this type include protective coats, jackets, jumpsuits, coveralls, hoods, etc. used by industrial personnel such as electricians and process control specialists and others that may work in an electrical arc potential environment. In a preferred embodiment, the protective garment is a coat or jacket, including a three-quarter length coat commonly used over the clothes and other protective gear when work on an electrical panel or substation is required.

In a preferred embodiment, the protective articles or garments in a single fabric layer have a ATPV of greater than 2 cal/cm$^2$/oz, which is at least a Category 2 arc rating or higher as measured by either of two common category rating systems for arc ratings. The National Fire Protection Association (NFPA) has 4 different categories with Category 1 having the lowest performance and Category 4 having the highest performance. Under the NFPA 70E system, Categories 1, 2, 3, and 4 correspond to a minimum threshold heat flux through the fabric of 4, 8, 25, and 40 calories per square centimeter, respectively. The National Electric Safety Code (NESC) also has a rating system with 3 different categories with Category 1 having the lowest performance and Category 3 having the highest performance. Under the NESC system, Categories 1, 2, and 3 correspond to a minimum threshold heat flux through the fabric of 4, 8, and 12 calories per square centimeter, respectively. Therefore, a fabric or garment having a Category 2 arc rating can withstand a thermal flux of 8 calories per square centimeter, as measured per standard set method ASTM F1959 or NFPA 70E.

In a preferred embodiment, the fabrics and articles preferably have an "L*" value ranging from 50 to 90.

Test Methods

Arc Resistance. The arc resistance of fabrics of this invention is determined in accordance with ASTM F-1959-99 "Standard Test Method for Determining the Arc Thermal Performance Value of Materials for Clothing". Preferably fabrics of this invention have an arc resistance (ATPV) of at least 0.8 calories and more preferably at least 2 calories per square centimeter per ounce per square yard.

ThermoGravimetric Analysis (TGA). Fiber that retains at least 90 percent of its weight when heated to 425 degrees Celsius at a rate of 10 degrees per minute can be determined using a Model 2950 Thermogravimetric Analyzer (TGA) available from TA Instruments (a division of Waters Corporation) of Newark, Del. The TGA gives a scan of sample weight loss versus increasing temperature. Using the TA Universal Analysis program, percent weight loss can be measured at any recorded temperature. The program profile consists of equilibrating the sample at 50 degrees C.; ramping the temperature 10° C. per minute from 50 to 1000 degrees C.; using air as the gas, supplied at 10 ml/minute; and using a 500 microliter ceramic cup (PN 952018.910) sample container. A specific testing procedure is as follows. The TGA was programmed using the TGA screen on the TA Systems 2900 Controller. The sample ID was entered and the planned temperature ramp program of 20 degrees per minute selected. The empty sample cup was tared using the tare function of the instrument. The fiber sample was cut into approximately 1/16" (0.16 cm) lengths and the sample pan was loosely filled with the sample. The sample weight should be in the range of 10 to 50 mg. The TGA has a balance therefore the exact weight does not have to be determined beforehand. None of the sample should be outside the pan. The filled sample pan was loaded onto the balance wire making sure the thermocouple is close to the top edge of the pan but not touching it. The furnace is raised over the pan and the TGA is started. Once the program is complete, the TGA will automatically lower the furnace, remove the sample pan, and go into a cool down mode. The TA Systems 2900 Universal Analysis program is then used to analyze and produce the TGA scan for percent weight loss over the range of temperatures.

Limited Oxygen Index. The limited oxygen index (LOI) of fabrics of this invention is determined in accordance with ASTM G-125-00 "Standard Test Method for Measuring Liquid and Solid Material Fire Limits in Gaseous Oxidants".

Color Measurement. The system used for measuring color and spectral reflectance is the 1976 CIELAB color scale (L*-a*-b* system developed by the Commission Internationale de l'Eclairage). In the CIE "L*-a*-b*" system, color is viewed as point in three-dimensional space. The "L*" value is the lightness coordinate with high values being the lightest, the "a*" value is the red/green coordinate with "+a*" indicating red hue and "−a*" indicating green hue and the "b*" value is the yellow/blue coordinate with "+b*" indicating yellow hue and "−b*" indicating blue hue. A spectrophotometer was used to measure the color of samples, either in puffs of fiber or in fabric or garment form as indicated. Specifically, a Hunter Lab UltraScan® PRO spectrophotometer was used, including the industry standard of 10-degree observer and D65 illuminant. The color scale used herein uses the coordinates of the CIE ("L*-a*-b*) color scale with the asterisk, as opposed to the coordinates of the older Hunter color scale, which are designated ("L-a-b") without the asterisk.

Weight Percent of Carbon Particles. The nominal amount of carbon black in the fiber, when making the fiber, is determined by a simple mass balance of ingredients. After the fiber is made, the amount of carbon black present in the fiber can be determined by measuring the weight of a sample of fiber, removing the fiber by dissolution of the polymer in a suitable solvent that does not affect the carbon black particles, washing the remaining solids to remove any inorganic salts that are not carbon, and weighing the remaining solids. One specific method includes weighing about a gram of the fiber, yarn, or fabric to be tested and heating that sample in an oven at 105° C. for 60 minutes to remove any moisture, followed by placing the sample in a desiccator to cool to room temperature, followed by weighing the sample to obtain an initial weight to a precision of 0.0001 grams. The sample is then placed in a 250 ml flat bottom flask with a stirrer and 150 ml of a suitable solvent, for example 96% sulfuric acid, is added. The flask is then placed on a combination stir/heater with a chilled water condenser operating with enough flow to prevent any fumes from exiting the top of the condenser. The heat is then applied while stirring until the yarn is fully dissolved in the solvent. The flask is then removed from the heater and allowed to cool to room temperature. The contents of the flask are then vacuum filtered using a Millipore vacuum filter unit with a tared 0.2 micron PTFE filter paper. Remove the vacuum and then rinse the flask out with 25 ml of additional solvent, which is also passed through the filter. The Millipore unit is then removed from the vacuum flask and reset on a new clean glass vacuum flask. With vacuum, the residue on the filter paper is washed with water until a pH paper check on the filtrate indicates the wash water to be neutral. The residue is then finally washed with methanol. The filter paper with residue sample is removed, placed in a dish, and heated in an oven at 105° C. to dry for 20 minutes. The filter paper with residue sample in then put in a desiccator to cool to room temperature, followed by weighing the filter paper with residue sample to obtain the final weight to a precision of 0.0001 grams. The weight of the filter is subtracted from the weight of the filter paper with residue sample. This weight is then divided by the initial weight of the yarn or fiber or fabric and multiplied by 100. This will give the weight percentage of the carbon black in the fiber, yarn, or fabric.

Particle Size. Carbon particle size can be measured using the general provisions of ASTM B822-10—"Standard Test Method for Particle Size Distribution of Metal Powders and Related Compounds by Light Scattering".

Shrinkage. To test for fiber shrinkage at elevated temperatures, the two ends of a sample of multi-filament yarn to be tested are tied together with a tight knot such that the total interior length of the loop is approximately 1 meter in length. The loop is then tensioned until taut and the doubled length of the loop measured to the nearest 0.1 cm. The loop of yarn is then hung in an oven for 30 minutes at 185 degrees Celsius. The loop of yarn is then allowed to cool, it is re-tensioned and the doubled length is re-measured. Percent shrinkage is then calculated from the change in the linear length of the loop.

EXAMPLES

In the examples that follow, unless designated differently, the natural meta-aramid fiber was amorphous or uncrystallized poly(m-phenylene isophthalamide) (MPD-I) fiber, and the natural para-aramid fiber was poly(p-phenylene terephthalamide) (PPD-T); both of these were free of carbon particles, that is, they did not contain any added carbon-black. The black meta-aramid fiber was crystallized MPD-I fiber that further contained carbon particles or carbon-black. The black para-aramid fiber was PPD-T fiber that was made with a mixture of pigments to mimic a black color, but this PPD-T fiber was also free of discrete carbon particles or carbon-black. The modacrylic fiber was a ACN/polyvinylidene chloride co-polymer with 6.8% antimony.

Control Example

An intimate blend of staple fibers in the form of a picker blend sliver of 18 weight percent natural meta-aramid fiber, 18 weight percent para-aramid fiber, and 64 weight percent modacrylic fiber was prepared, and then was made into spun staple yarn using cotton system processing and an air-jet spinning frame. The resultant yarn was a 21 tex (28 cotton count) single yarn. Two single yarns were then plied on a plying machine to make a two-ply yarn having a ply twist of 10 turns/inch.

The yarn was then used as the warp and fill yarns of a fabric that was woven on a shuttle loom in a warp-faced 2×1 twill construction. The greige twill fabric had a construction of approximately 31 ends×18 picks per cm (77 ends×52 picks per inch) and a basis weight of 220 g/m² (6.5 oz/yd²). The fabric was then submitted for arc testing and the results are shown in Table 1.

Example 1

An intimate blend of staple fibers in the form of a picker blend sliver of 18 weight percent carbon-containing black meta-aramid fiber, 18 weight percent non-carbon-containing black para-aramid fiber, and 64 weight percent modacrylic fiber was prepared, and then was made into spun staple yarn using cotton system processing and an air-jet spinning frame. The resultant yarn was a 21 tex (28 cotton count) single yarn. Two single yarns were then plied on a plying machine to make a two-ply yarn having a ply twist of 10 turns/inch.

The yarn was then used as in the warp and fill of a fabric that was woven on a shuttle loom in a warp-faced 2×1 twill construction. The greige twill fabric had a construction of approximately 31 ends×18 picks per cm (77 ends×52 picks per inch) and a basis weight of 220 g/m² (6.5 oz/yd²). The fabric was submitted for arc testing and the results are shown in Table 1. The arc performance of the fabric increased by almost 90% with the addition of only 0.38 weight percent carbon particles in the blend.

Example 2

Example 1 was repeated to make a fabric; however, the 18 weight percent non-carbon-containing black para-aramid fiber was replaced with 18 weight percent natural para-aramid fiber. The fabric was submitted for arc testing and the results are shown in Table 1. The weight percent carbon particles and the arc performance of this sample was the same as in Example 1, confirming the non-carbon-containing black para-aramid fiber had no effect on arc performance.

Example 3

Example 1 was repeated to make a fabric; however, the intimate blend of staple fibers used was 36 weight percent carbon-containing black meta-aramid fiber, 20 weight percent non-carbon-containing black para-aramid fiber, and 44 weight percent modacrylic fiber. The fabric was submitted for arc testing and the results are shown in Table 1. As can be seen from the arc performance, the addition of carbon-containing black meta-aramid fiber had significant effect on arc performance versus the control, but also, the amount modacrylic also synergistically affects the final ATPV. A higher weight percentage of modacrylic fiber in the blend helped achieve higher arc performance numbers in Examples 1 and 2.

TABLE 1

| Ex. | Black MPD-I (%) | Natural MPD-I (%) | Modacrylic (%) | Black PPD-T (%) | Natural PPD-T (%) | Carbon in the Blend (%) | Basis Weight (oz/yd²) | ATPV (cal/cm²) |
|---|---|---|---|---|---|---|---|---|
| Control |  | 18 | 64 | 0 | 18 | 0 | 6.5 | 9.5 |
| 1 | 18 |  | 64 | 18 |  | 0.38 | 6.5 | 18 |

TABLE 1-continued

| Ex. | Black MPD-I (%) | Natural MPD-I (%) | Mod-acrylic (%) | Black PPD-T (%) | Natural PPD-T (%) | Carbon in the Blend (%) | Basis Weight (oz/yd$^2$) | ATPV (cal/cm$^2$) |
|---|---|---|---|---|---|---|---|---|
| 2 | 18 | | 64 | | 18 | 0.38 | 6.5 | 18 |
| 3 | 36 | | 44 | 20 | | 0.8 | 6.5 | 15.5 |

Example 4

Example 1 was repeated to make the yarns having the same composition for weaving a fabric; but finer singles yarns were made having of cotton count 34. This created a lower basis weight greige fabric having a basis weight of 186 g/m$^2$ (5.5 oz/yd$^2$). The fabric was submitted for arc testing and the results are shown in Table 2.

Example 5

Example 4 was repeated but even finer singles yarns were made having of cotton count 36, creating an even lower basis weight greige fabric having a basis weight of 173 g/m$^2$ (5.1 oz/yd$^2$). The fabric was submitted for arc testing and the results are shown in Table 2.

TABLE 2

| Ex. | Yarn Size (cc) | Basis Weight (oz) | Carbon in the Blend (%) | ATPV (cal/cm$^2$) |
|---|---|---|---|---|
| Control | 28.2 | 6.5 | 0 | 9.5 |
| 1 | 28/2 | 6.5 | 0.38 | 18 |
| 4 | 34/2 | 5.5 | 0.38 | 13 |
| 5 | 36/2 | 5.1 | 0.38 | 11.7 |

Table 2 illustrates the addition of carbon particles in the meta-aramid fiber allows the basis weight of the control fabric to be significantly reduced while maintaining equivalent arc performance.

What is claimed is:

1. An intimate blend of staple fibers, comprising:
 (a) 15 to 70 weight percent modacrylic fiber;
 (b) 5 to 27 weight percent para-aramid fiber; and
 (c) 3 to 80 weight percent meta-aramid fiber;
 wherein,
  i) 25 to 100 parts of the meta-aramid fiber present in the blend contains 0.5 to 20 weight percent carbon particles having an average particle size of 10 micrometers or less, based on the amount of carbon particles in an individual fiber, the carbon particles being homogeneously dispersed in that fiber; and
  ii) 0 to 75 parts of the meta-aramid fiber present in the blend are free of carbon particles;
 the intimate blend having a total content of 0.1 to 3 weight percent carbon particles.

2. The intimate blend of staple fibers of claim 1, comprising:
 (a) 40 to 70 weight percent modacrylic fiber;
 (b) 5 to 20 weight percent para-aramid fiber; and
 (c) 10 to 40 weight percent meta-aramid fiber;
 wherein,
  i) 25 to 100 parts of the meta-aramid fiber present in the blend contains 0.5 to 20 weight percent carbon particles having an average particle size of 10 micrometers or less, based on the amount of carbon particles in an individual fiber, the carbon particles being homogeneously dispersed in that fiber; and
  ii) 0 to 75 parts of the meta-aramid fiber present in the blend are free of carbon particles;
 the intimate blend having a total content of 0.1 to 3 weight percent carbon particles.

3. The intimate blend of staple fibers of claim 1 wherein the meta-aramid fiber in i) is present in an amount of 25 to 50 parts, and the meta-aramid fiber in ii) is present in an amount of 50 to 75 parts.

4. The intimate blend of staple fibers of claim 1 having a total content of 0.5 to 3 weight percent carbon particles.

5. The intimate blend of staple fibers of claim 1 wherein the meta-aramid fiber in i) comprises 0.5 to 6 weight percent carbon particles.

6. The intimate blend of staple fibers of claim 1 wherein the meta-aramid is poly(meta-phenylene isophthalamide).

7. A yarn comprising the intimate blend of staple fibers of claim 1.

8. A fabric comprising the yarn of claim 7.

9. An article of thermal protective clothing comprising the fabric of claim 8.

10. A garment comprising the yarn of claim 7.

* * * * *